(12) United States Patent
Kinoshita et al.

(10) Patent No.: US 11,577,390 B2
(45) Date of Patent: Feb. 14, 2023

(54) INFORMATION PROCESSING DEVICE AND INFORMATION PROCESSING METHOD

(71) Applicant: SONY CORPORATION, Tokyo (JP)

(72) Inventors: Masaya Kinoshita, Tokyo (JP); Kazuo Hongo, Tokyo (JP); Hiroki Saijo, Tokyo (JP)

(73) Assignee: SONY CORPORATION, Tokyo (JP)

( * ) Notice: Subject to any disclaimer, the term of this patent is extended or adjusted under 35 U.S.C. 154(b) by 73 days.

(21) Appl. No.: 17/059,040

(22) PCT Filed: Mar. 14, 2019

(86) PCT No.: PCT/JP2019/010454
§ 371 (c)(1),
(2) Date: Nov. 25, 2020

(87) PCT Pub. No.: WO2019/235020
PCT Pub. Date: Dec. 12, 2019

(65) Prior Publication Data
US 2021/0213609 A1    Jul. 15, 2021

(30) Foreign Application Priority Data

Jun. 5, 2018  (JP) .............................. JP2018-107773

(51) Int. Cl.
*B25J 9/16* (2006.01)
*B25J 9/00* (2006.01)
*B62D 57/032* (2006.01)

(52) U.S. Cl.
CPC ........... *B25J 9/1653* (2013.01); *B25J 9/0009* (2013.01); *B25J 9/162* (2013.01); *B25J 9/1638* (2013.01); *B62D 57/032* (2013.01)

(58) Field of Classification Search
CPC ........ B25J 9/0009; B25J 9/162; B25J 9/1638; B25J 9/1653; B25J 13/085; B62D 57/032
See application file for complete search history.

(56) References Cited

U.S. PATENT DOCUMENTS

| 9,499,218 | B1* | 11/2016 | Stephens | B25J 9/1651 |
| 9,833,899 | B1* | 12/2017 | Blankespoor | B25J 9/1633 |
| 2004/0107780 | A1* | 6/2004 | Kawai | B62D 57/032 |
| | | | | 73/862.08 |

(Continued)

FOREIGN PATENT DOCUMENTS

| CA | 2451730 A1 | 1/2003 |
| CN | 1520350 A | 8/2004 |
| CN | 106737669 A * | 5/2017 |
| EP | 1415770 A1 | 5/2004 |
| JP | 04-365576 A | 12/1992 |

(Continued)

OTHER PUBLICATIONS

Kosuke Matsuki, "Proposal of approximate ZMP estimation method without force sensor", The Robotics Society of Japan, non-official translation, Proceedings of the 24th Annual Conference of the Robotics Society of Japan CD-ROM, 1F34, Sep. 14, 2006.

(Continued)

*Primary Examiner* — Dale Moyer
(74) *Attorney, Agent, or Firm* — Chip Law Group (57) ABSTRACT

A center of gravity of a robot device is estimated without utilization of a force sensor or the like. An information processing device including a center-of-gravity estimation unit that calculates, on the basis of torque applied to one or more joints included in each of a plurality of leg portions, reaction force applied from a ground contact surface to each of the plurality of leg portions, and that estimates a center of gravity of a robot device including the plurality of leg portions on the basis of the calculated reaction force on the plurality of leg portions.

11 Claims, 7 Drawing Sheets

(56) References Cited

U.S. PATENT DOCUMENTS

| | | | |
|---|---|---|---|
| 2004/0167641 A1 | 8/2004 | Kawai et al. | |
| 2007/0013506 A1* | 1/2007 | Takenaka | B25J 13/085 |
| | | | 340/500 |
| 2008/0109115 A1* | 5/2008 | Lim | B62D 57/032 |
| | | | 901/1 |

FOREIGN PATENT DOCUMENTS

| | | |
|---|---|---|
| JP | 06-170758 A | 6/1994 |
| JP | 2003-089083 A | 3/2003 |
| JP | 2003080478 A | 3/2003 |
| JP | 2009095933 A | 5/2009 |
| JP | 2015100904 A | 6/2015 |
| JP | 2017-144512 A | 8/2017 |
| KR | 10-0847319 B1 | 7/2008 |
| WO | 2003/002309 A1 | 1/2003 |
| WO | WO-2005051612 A1 | 6/2005 |

OTHER PUBLICATIONS

International Search Report and Written Opinion of PCT Application No. PCT/JP2019/010454, dated Jun. 11, 2019, 08 pages of ISRWO.

Suga et al., "Estimating ZMP (Zero Moment Point) and GRF (Ground Reaction Force) by Means of Accelerator Instead of Force Sensor", Yokohama National University, Heisei 21 (2009) The Institute of Electrical Engineers of Japan National Conference Lecture Collected Papers [CD-ROM], Japan, Mar. 17, 2009, 2 pages.

Nishioka et al, "Estimation of Ground Reaction Force and Center of Gravity by Using Foot Pressure Sensor", 26th Proceedings of Symposium of the Robotics Society of Japan CD-ROM 2008 The 26 th Annual Conference of the RoboticsSociety of Japan, Japan, Robotics Society of Japan, 5 pages.

Doi et al, "Design of Inexpensive Joint Torque Sensor for Legged Robots Using Float Differential Mechanism", Mechatronics lecture meeting 2017 lecture-meeting collected-papers 2017 JSME Conference on using the float differential mechanism for Takahiro and a legged robot Robotics and Mechatronics, Japan, general association method man day book Japan Society of Mechanical Engineers The Japan Society of Mechanical Engineers, May 10, 2017, 5 pages.

Japanese Office Action dated Sep. 27, 2022, and its translation for JP2020-523525, 12 pages.

* cited by examiner

INFORMATION PROCESSING DEVICE AND INFORMATION PROCESSING METHOD

CROSS REFERENCE TO RELATED APPLICATIONS

This application is a U.S. National Phase of International Patent Application No. PCT/JP2019/010454 filed on Mar. 14, 2019, which claims priority benefit of Japanese Patent Application No. JP 2018-107773 filed in the Japan Patent Office on Jun. 5, 2018. Each of the above-referenced applications is hereby incorporated herein by reference in its entirety.

FIELD

The present disclosure relates to an information processing device, an information processing method, and a program.

BACKGROUND

Recently, a legged robot device has been developed as a mobile robot. The legged robot device can move freely even in an environment including a step or stairs and an environment such as an uneven ground in which environments a wheeled robot device has difficulty in moving. Thus, the legged robot device is expected to be a mobile object that can perform transportation of baggage on a mountain road or the like, which transportation has been performed by humans, instead.

Various technologies have been studied as technologies for controlling a posture or walking of such a legged robot device. For example, Patent Literature 1 below discloses a legged robot that includes a force sensor on a sole of a leg portion and that determines a center of gravity in transportation of baggage on the basis of a sensing result by the force sensor.

CITATION LIST

Patent Literature

Patent Literature 1: Japanese Patent Application Laid-Open No. 6-170758

SUMMARY

Technical Problem

However, since an expensive force sensor is used, a manufacturing cost of the legged robot described in Patent Literature 1 is high. Also, in the legged robot described in Patent Literature 1, a force sensor is provided on a sole of a leg portion to which heavy load is applied. Thus, the force sensor is likely to be plastically deformed or destroyed, and needs to be replaced frequently. Thus, the legged robot described in Patent Literature 1 has a high operation cost.

Thus, the present disclosure proposes a new and improved information processing device, information processing method, and program capable of estimating a center of gravity of a robot device without using a force sensor or the like.

Solution to Problem

According to the present disclosure, an information processing device is provided that includes: a center-of-gravity estimation unit that calculates, on the basis of torque applied to one or more joints included in each of a plurality of leg portions, reaction force applied from a ground contact surface to each of the plurality of leg portions, and that estimates a center of gravity of a robot device including the plurality of leg portions on the basis of the calculated reaction force on the plurality of leg portions.

Moreover, according to the present disclosure, an information processing method is provided that includes: calculating, on the basis of torque applied to one or more joints included in each of a plurality of leg portions, reaction force applied from a ground contact surface to each of the plurality of leg portions; and estimating a center of gravity of a robot device including the plurality of leg portions on the basis of the calculated reaction force on the plurality of leg portions, calculating and estimating being performed by an arithmetic processing unit.

Moreover, according to the present disclosure, a program is provided that causes a computer to function as a center-of-gravity estimation unit that calculates, on the basis of torque applied to one or more joints included in each of a plurality of leg portions, reaction force applied from a ground contact surface to each of the plurality of leg portions, and that estimates a center of gravity of a robot device including the plurality of leg portions on the basis of the calculated reaction force on the plurality of leg portions.

According to the present disclosure, it is possible to estimate reaction force applied from a ground contact surface to each leg portion on the basis of torque applied to each joint of the leg portion and a length of each link of the leg portion. Thus, it is possible to estimate a load center point of a robot device.

Advantageous Effects of Invention

As described above, according to the present disclosure, it is possible to estimate a center of gravity of a robot device without using a force sensor or the like.

Note that the above effect is not necessarily a limitation, and any of effects described in the present specification or other effects that can be grasped from the present specification may be acquired together with or instead of the above effect.

DESCRIPTION OF EMBODIMENTS

Hereinafter, preferred embodiments of the present disclosure will be described in detail with reference to the accompanying drawings. Note that in the present specification and drawings, the same reference signs are assigned to components having substantially the same functional configuration, and overlapped description is omitted.

Note that the description will be made in the following order.

1. Outline
2. Configuration example
3. Operation example

1. Outline

Figure 1:
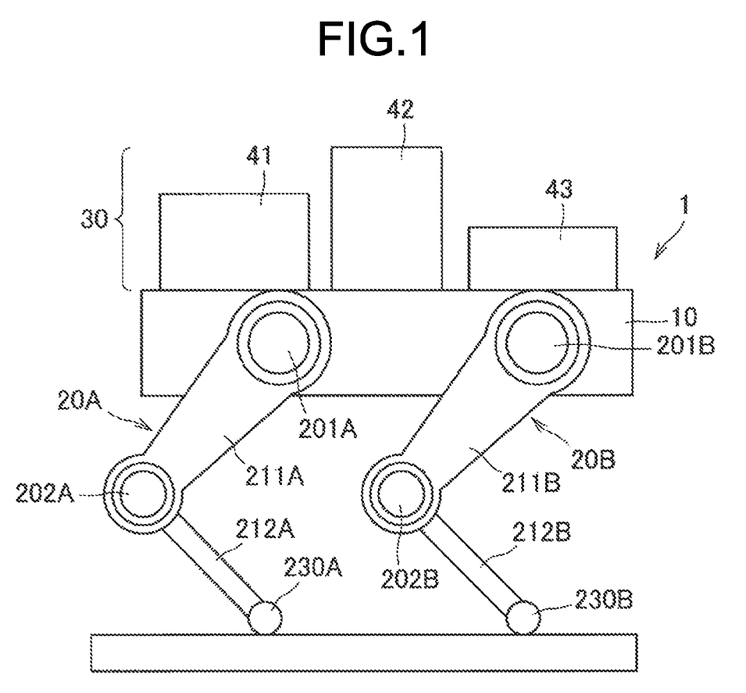
FIG. 1 is a view for describing an outline of a robot device to which an information processing device according to an embodiment of the present disclosure is applied.

First, an outline of an information processing device according to an embodiment of the present disclosure will be described with reference to FIG. 1. FIG. 1 is a view for describing an outline of a robot device to which the information processing device according to the present embodiment is applied.

As illustrated in FIG. 1, the information processing device according to the present embodiment can be applied to a legged robot device 1.

For example, the robot device 1 is a four-legged robot device that has four leg portions and that transfers loads 41, 42, and 43 (hereinafter, collectively referred to as load 40 in a case of not being distinguished from each other). More specifically, the robot device 1 includes a main body portion 10 and a plurality of leg portions 20A, 20B, 20C, and 20D (hereinafter, collectively referred to as leg portion 20 in a case of not being distinguished from each other). Note that in FIG. 1, the leg portion 20A and the leg portion 20B are illustrated. However, the leg portion 20C and the leg portion 20D (not illustrated) having configurations similar to those of the leg portion 20A and the leg portion 20B are further included on a back side on a plane of paper of the leg portion 20A and the leg portion 20B.

The main body portion 10 includes a housing to which the plurality of leg portions 20 is attached, and controls driving of the plurality of leg portions 20. For example, the main body portion 10 may include a drive motor that drives the plurality of leg portions 20, a control device that controls driving of the plurality of leg portions 20, and the like. Also, on a vertically upward back surface of the main body portion 10, a loading portion 30 on which a load 40 can be placed is provided.

The drive motor may be anything as long as torque can be generated. For example, the drive motor may be an electric motor that converts electric energy into a rotary motion. The control device controls a posture or walking of the robot device 1 by driving the leg portions 20 in cooperation with each other. More specifically, the control device controls driving of each of the leg portions 20 on the basis of a position of a center of gravity of the robot device 1, and the like in such a manner that the robot device 1 does not roll over and can walk stably. The loading portion 30 holds the load 40 in a stable manner. For example, the loading portion 30 may be configured by provision of a fence to prevent a fall of the load 40 on the flat back surface of the main body portion 10.

The plurality of leg portions 20 is attached to the main body portion 10, each including a plurality of links and a joint to couple the plurality of links. Structures of the leg portions 20 may be the same or different from each other. By being driven by a drive motor included in the main body portion 10 or drive motors built in the joints, the leg portions 20 can support the robot device 1 and cause the robot device 1 to walk.

The number of leg portions 20 only needs to be at least two or more in order to enable the robot device 1 to walk, and an upper limit thereof is not specifically limited. However, in order to stably support the robot device 1, the number of leg portions 20 may be three or more. Also, in order to cause the robot device 1 to walk stably, the number of leg portions 20 may be four or more.

For example, as illustrated in FIG. 1, the leg portion 20A may include a first joint 201A, a first link 211A, a second joint 202A, a second link 212A, and a ground contact portion 230A. Similarly, the leg portion 20B may include a first joint 201B, a first link 211B, a second joint 202B, a second link 212B, and a ground contact portion 230B.

The first joint 201A rotatably joins the first link 211A to the main body portion 10. More specifically, by being joined to one end side of the first link 211A, the first joint 201A joins the first link 211A to the main body portion 10 in such a manner that the first link 211A can rotate with an axis vertical to an extending direction of the first link 211A as a rotation axis. For example, the first joint 201A may join the first link 211A to the main body portion 10 in such a manner that the first link 211A can rotate with a pitch axis of walking of the robot device 1 as a rotation axis. Note that a rotation range of the first joint 201A is not specifically limited.

The first link 211A is joined to the main body portion 10 on the one end side via the first joint 201A, and is provided rotatably with respect to the main body portion 10 with the first joint 201A as a rotation axis. The first link 211A is joined to one end side of the second link 212A on the other end side via the second joint 202A, and is provided rotatably with respect to the second link 212A with the second joint 202A as a rotation axis.

The second joint 202A rotatably joins the second link 212A to the first link 211A. More specifically, by being joined to the one end side of the second link 212A, the second joint 202A joins the second link 212A to the first link 211A in such a manner that the second link 212A can rotate with an axis vertical to an extending direction of the second link 212A as a rotation axis. For example, the second joint 202A may join the second link 212A to the first link 211A in such a manner that the second link 212A can rotate with the pitch axis of walking of the robot device 1 as a rotation axis. Note that a rotation range of the second joint 202A is not specifically limited.

The second link 212A is joined to the other end side of the first link 211A on the one end side via the second joint 202A, and is provided rotatably with respect to the first link 211A with the second joint 202A as a rotation axis. On the other end side of a first link 201, a ground contact portion 230A that comes into contact with the ground or the like is provided.

The ground contact portion 230A is a portion that comes into contact with the ground, and is provided on a leading end side of the leg portion 20A. For example, the ground contact portion 230A may be a cover or a shock absorber to protect the leg portion 20A from the ground or the like.

Since the first joint 201B, the first link 211B, the second joint 202B, the second link 212B, and the ground contact portion 230B of the leg portion 20B are substantially similar to the first joint 201A, the first link 211A, the second joint 202A, the second link 212A, and the ground contact portion 230A of the leg portion 20A respectively, a description thereof is omitted here.

Such a robot device 1 is a mobile object that holds and transports the load 40 in the loading portion 30. Here, the load 40 does not have constant weight or shape but arbitrary weight or shape. Thus, depending on weight or a shape of the load 40 and a placed position of the load 40 in the loading portion 30, stability of a posture or walking of the robot device 1 may be decreased. More specifically, since weight balance of the entire robot device 1 including the load 40 changes by loading of the load 40, a possibility that the robot device 1 loses balance and rolls over during walking is increased.

In such a robot device 1, the information processing device according to the present embodiment estimates a position of a center of gravity of the entire robot device 1 after loading of the load 40, and controls walking and the like of the robot device 1 according to a control model based on the estimated position of the center of gravity. Accordingly, the information processing device can improve stability of a posture or walking of the robot device 1 on which the load 40 having unknown weight or shape is loaded.

Also, the information processing device according to the present embodiment calculates reaction force from a ground contact surface to each leg portion 20 on the basis of torque applied to each joint of the leg portion 20, and estimates a position of a center of gravity of the entire robot device 1 on the basis of the calculated reaction force. Accordingly, the information processing device can estimate the position of the center of gravity of the entire robot device 1 after loading of the load 40 without using an expensive and fragile force sensor. Thus, a production cost and operation cost of the robot device 1 can be decreased.

In the following, a configuration of the information processing device according to the present embodiment, an outline of which is described above, will be described more specifically.

2. Configuration Example

Figure 2:
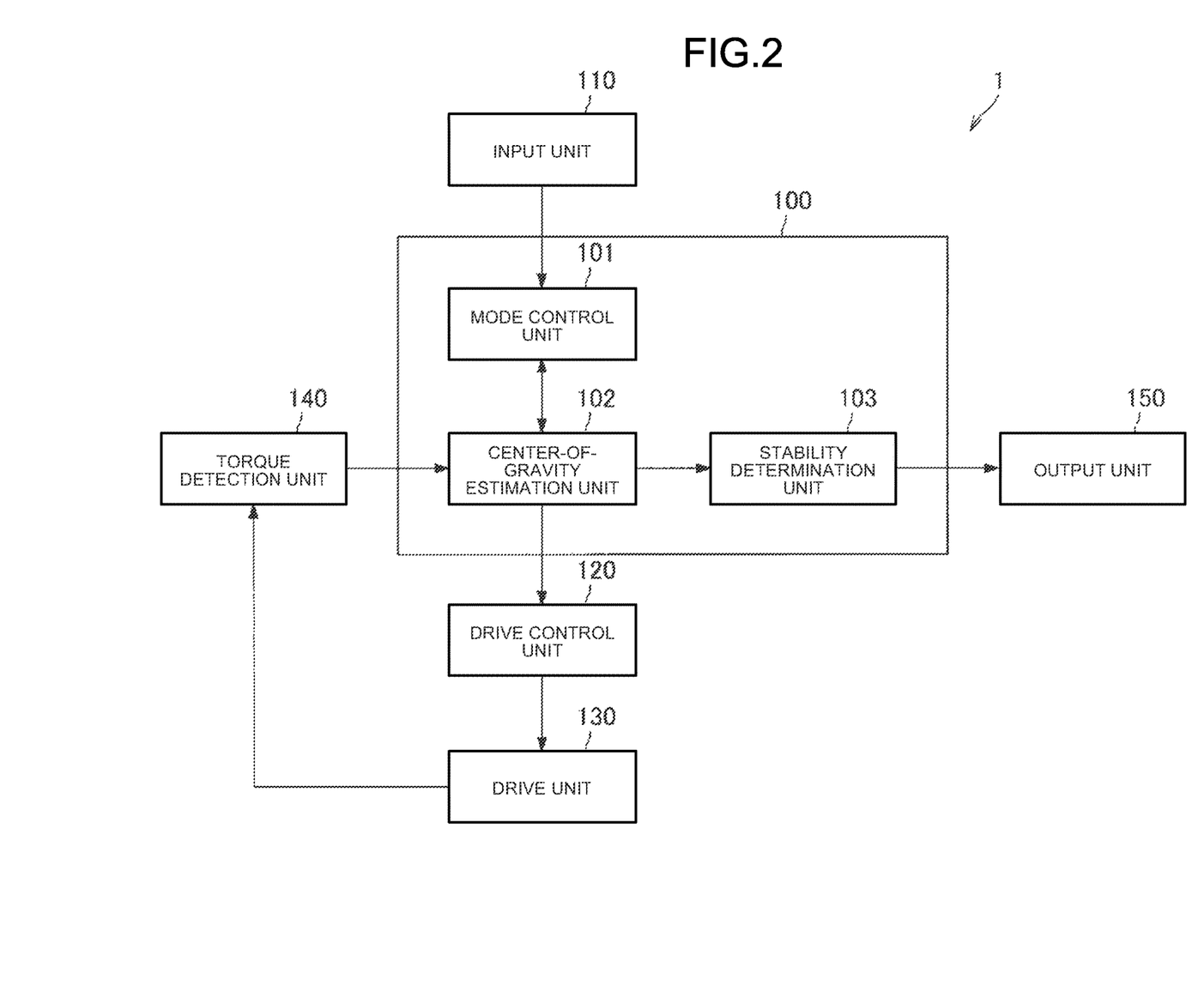
FIG. 2 is a block diagram illustrating a functional configuration of the robot device including the information processing device according to the embodiment.

Next, a configuration example of an information processing device according to the present embodiment will be described with reference to FIG. 2. FIG. 2 is a block diagram illustrating a functional configuration of the robot device 1 including an information processing device 100 according to the present embodiment. Note that the information processing device 100 may be provided in the main body portion 10 of the robot device 1, for example.

As illustrated in FIG. 2, the robot device 1 includes an input unit 110, an information processing device 100, a drive control unit 120, a drive unit 130, a torque detection unit 140, and an output unit 150.

The input unit 110 includes an input device that enables a user to input information to the robot device 1. The input unit 110 may include, for example, an input device to which information is input and which is, for example, a touch panel, a button, a microphone, a switch, or a lever, and an input control circuit that generates an input signal on the basis of input information. For example, an instruction to control the robot device 1 into a mode of loading or unloading the load 40 to or from the robot device 1 (hereinafter, also referred to as load transfer mode) may be input into the input unit 110 by a user, and the input unit 110 may output the input instruction to a mode control unit 101.

The information processing device 100 includes the mode control unit 101, a center-of-gravity estimation unit 102, and a stability determination unit 103.

The mode control unit 101 controls a control state (that is, control mode) of the robot device 1. More specifically, the mode control unit 101 changes the control state of the robot device 1 into the load transfer mode. The load transfer mode is a control state in which the user loads the load 40 to the loading portion 30 of the robot device 1 or unloads the load 40 from the loading portion 30.

In the load transfer mode, the robot device 1 is controlled to maintain a predetermined posture, and more specifically, controlled to maintain a rotation angle of each joint of the leg portions 20 regardless of an increase/decrease of the load 40 loaded on the loading portion 30. Accordingly, even in a case where the load 40 loaded on the loading portion 30 of the robot device 1 is increased/decreased and weight balance of the entire robot device 1 changes, each joint of the leg portions 20 is controlled, by a change in magnitude of the applied torque, in such a manner that a rotation angle of the joint is maintained.

Thus, the magnitude of the torque applied to each joint of the leg portions 20 in the load transfer mode depends on the weight balance of the entire robot device 1 including the loaded load 40. Thus, the information processing device 100 can estimate a change in the position of the center of gravity of the entire robot device 1 from a change in the torque applied to each joint of the leg portions 20 in the load transfer mode.

The center-of-gravity estimation unit 102 estimates the position of the center of gravity of the entire robot device 1 including the load 40 placed on the loading portion 30 on the basis of the torque applied to each joint of the leg portions 20.

More specifically, first, the center-of-gravity estimation unit 102 acquires, from the torque detection unit 140, information related to magnitude of torque applied to a joint included in each leg portion 20. Subsequently, the center-of-gravity estimation unit 102 determines magnitude of reaction force received by each leg portion 20 from a ground contact surface on the basis of the magnitude of the torque applied to the joint included in each leg portion 20 and a length of a link included in each leg portion 20. Then, the center-of-gravity estimation unit 102 estimates a plan position of the center of gravity of the entire robot device 1 including the load 40 placed on the loading portion 30 on the basis of the magnitude of the reaction force received by each leg portion 20 from the ground contact surface.

Furthermore, in a case where the center-of-gravity estimation unit 102 also estimates a height of the center of gravity of the entire robot device 1 including the load 40, the center-of-gravity estimation unit 102 rotates a posture of the robot device 1 around a center of gravity of the robot device 1 alone. Then, the center-of-gravity estimation unit 102 estimates a plan position of the center of gravity of the entire robot device 1 including the load 40 in a state in which the posture of the robot device 1 is rotated. The center-of-gravity estimation unit 102 can estimate a height of the center of gravity of the entire robot device 1 including the load 40 placed on the loading portion 30 by geometrically performing calculation by using plan positions of the center of gravity of the robot device 1 in different postures.

Note that the center-of-gravity estimation unit 102 may estimate the height of the center of gravity of the entire robot device 1 including the load 40 placed on the loading portion 30 by using another method different from the above-described method. The height of the center of gravity of the entire robot device 1 has a smaller contribution to stability of the posture or walking of the robot device 1 than the plan position of the center of gravity of the entire robot device 1. Thus, the center-of-gravity estimation unit 102 may change a method of estimating the height of the center of gravity of the entire robot device 1 in consideration of accuracy of acquired information or a calculation load.

The information processing device 100 according to the present embodiment can estimate the position of the center of gravity of the entire robot device 1 including the load 40 placed on the loading portion 30 on the basis of the torque applied to each joint of the leg portions 20. Thus, the information processing device 100 can estimate the position of the center of gravity of the robot device 1 without using an expensive and fragile force sensor.

Also, the information processing device 100 according to the present embodiment re-estimates a position of the center of gravity of the entire robot device 1 including the load 40 each time the load 40 is transferred to/from the loading portion 30. Thus, the information processing device 100 can control walking and the like of the robot device 1 on the basis of the position of the center of gravity of the entire robot device 1 including the load 40. Accordingly, each time weight balance of the robot device 1 changes, the information processing device 100 can change a control model of driving of the robot device 1 according to the changed weight balance. Thus, stability of the posture or walking of the robot device 1 can be improved.

The stability determination unit 103 determines the stability of the posture or walking of the robot device 1 in which the load 40 is loaded on the loading portion 30. More specifically, the stability determination unit 103 determines the stability of the posture or walking of the robot device 1 on the basis of the position of the center of gravity of the entire robot device 1 which position is estimated by the center-of-gravity estimation unit 102.

For example, the stability determination unit 103 may determine that stability of a posture or walking of the robot device 1 is higher as a position of a center of gravity of the entire robot device 1 becomes closer to a center of a polygon formed by connecting of ground contact surfaces of the leg portions 20 of the robot device 1 (also referred to as supporting polygon). Alternatively, the stability determination unit 103 may determine that stability of a posture or walking of the robot device 1 is higher as a position of a center of gravity of the entire robot device 1 including the load 40 becomes closer to a position of a center of gravity of the robot device 1 alone. Also, the stability determination unit 103 may determine a placed position of the load 40 at which position the stability of the posture or walking of the robot device 1 becomes higher. Accordingly, the information processing device 100 can give warning, suggestion, proposal, or notification to a user via the output unit 150 in such a manner that the stability of the posture or walking of the robot device 1 becomes higher.

Note that the information processing device 100 is realized, for example, by cooperation of hardware such as a central processing unit (CPU), a random access memory (RAM), and a read only memory (ROM) with software that controls operation of each component.

The CPU functions as an arithmetic processing unit, and executes overall information processing and information calculation in the information processing device 100 according to various programs stored in the ROM and the like. The ROM stores programs and operation parameters used by the CPU. The RAM temporarily stores a program used in execution of the CPU, parameters that arbitrarily vary in execution thereof, and the like. These CPU, ROM, and RAM are mutually connected by an internal bus, a bridge, or the like, for example.

Also, a computer program for causing the hardware such as the CPU, the ROM, and the RAM built in the information processing device 100 to perform functions equivalent to functions of the components of the information processing device according to the present embodiment can be also created. Moreover, it is possible to provide a storage medium that stores computer program.

The drive control unit 120 controls walking of the robot device 1 by controlling driving of each leg portion 20 of the robot device 1. More specifically, the drive control unit 120 outputs, to the drive unit 130, a control command for controlling rotation of a joint provided in each leg portion 20. Accordingly, the drive control unit 120 can control driving of each leg portion 20 on the basis of kinematics.

For example, the drive control unit 120 may control driving of each leg portion 20 of the robot device 1 on the basis of a position of the center of gravity of the robot device 1 in such a manner that the robot device 1 does not lose balance and roll over during walking. Also, in a case where a control state of the robot device 1 is changed to the load transfer mode, the drive control unit 120 may fix a rotation angle of each joint of the leg portions 20 in such a manner that the robot device 1 has a predetermined posture.

Such a method of controlling driving of each of the leg portions 20 based on a position of the center of gravity of the robot device 1 may be previously stored as a control model of the robot device 1 in a storage unit or the like built in the main body portion 10. The drive control unit 120 can control driving of the robot device 1 in such a manner as to enable more stable walking or the like by updating a position of a center of gravity of the robot device 1 alone in the control model of the robot device 1 with a position of a center of gravity of the entire robot device 1 including the load 40.

The drive unit 130 generates torque for rotating a joint included in each leg portion 20 on the basis of a control command or the like from the drive control unit 120. The drive unit 130 is, for example, an electric motor that performs a rotary motion by electric energy, and may be provided for each joint of the leg portions 20. Each of the leg portions 20 is bent or extended as each joint of the leg portions 20 is rotated by the drive unit 130.

The torque detection unit 140 detects magnitude of torque applied from the drive unit 130 to a joint in each of the leg portions 20. The torque detection unit 140 may include a magnetostrictive type, strain gauge-type, piezoelectric type, optical type, spring type, or capacitance type torque sensor, and may directly detect the torque applied to the joints. Alternatively, the torque detection unit 140 may include a voltmeter or an ammeter that detects magnitude of voltage or current applied to the drive unit 130, and may calculate torque applied to the joints on the basis of the magnitude of the voltage or current applied to the drive unit 130. The magnitude of the torque detected by the torque detection unit 140 is used together with a length of a link included in each of the leg portions 20 to calculate reaction force received by each of the leg portions 20 from a ground contact surface.

The output unit 150 includes a display device or an audio output device to give notification to a user or the like, and an output circuit to generate image information or audio information to be output to the display device or the audio output device. For example, the output unit 150 may notify the user that a control state of the robot device 1 is changed to the load transfer mode or that the load transfer mode is released. Also, on the basis of determination made by the stability determination unit 103, the output unit 150 may notify the user of information related to stability of a posture or walking of the robot device 1, information related to optimization of placement of the load 40 on the loading portion 30, or information related to load quantity of the load 40.

For example, in a case where the position of the center of gravity of the entire robot device 1 including the load 40 changes for a threshold value or more from the position of the center of gravity of the robot device 1 alone, the output unit 150 may notify the user that it is difficult to transport the load 40. Alternatively, the output unit 150 may give the user notification suggesting a placed position of the load 40 at which position a change amount between the position of the center of gravity of the entire robot device 1 including the load 40 and the position of the center of gravity of the robot device 1 alone becomes smaller. Alternatively, the output unit 150 may notify the user of weight of the load 40 which weight is estimated from magnitude of reaction force received by each of the leg portions 20 from a ground contact surface, or notify the user of weight of the load 40 that can be additionally loaded on the robot device 1 on the basis of weight of the loaded load 40.

For example, the output unit 150 may include a display device such as a cathode ray tube (CRT) display device, a liquid crystal display device, or an organic electroluminescence (organic EL) display device, or may include an audio output device such as a speaker or a buzzer. Also, the output unit 150 may include a light emitter such as a light bulb, a light emitting diode (LED), or a laser.

Figure 3:
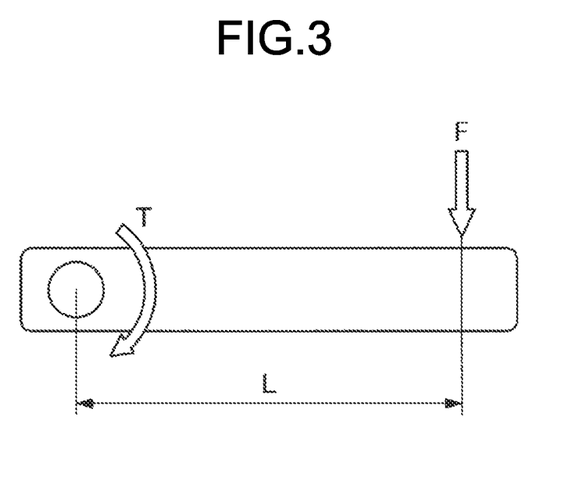
FIG. 3 is a schematic diagram for describing a relationship between torque and force.
Figure 4:
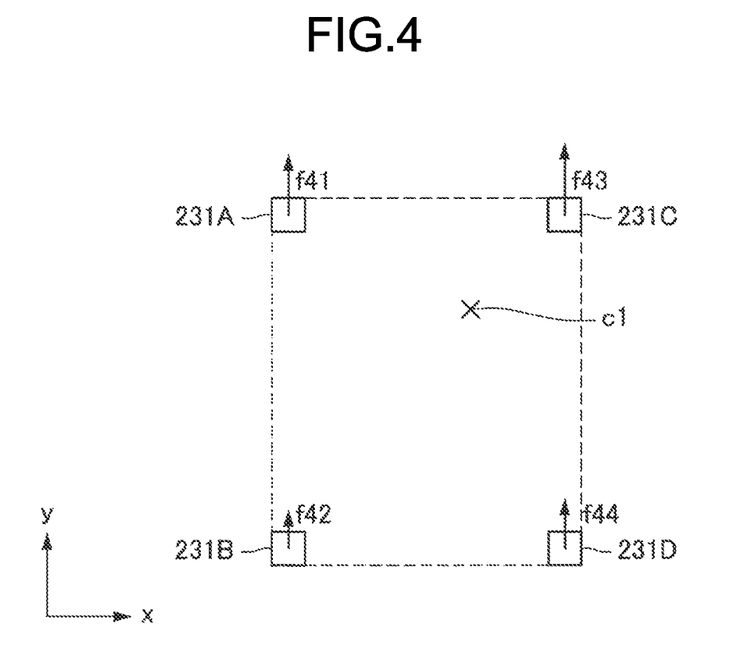
FIG. 4 is a view for describing a method of calculating a plan position of a center of gravity on the basis of reaction force received by each of four leg portions from a ground contact surface.
Figure 5:
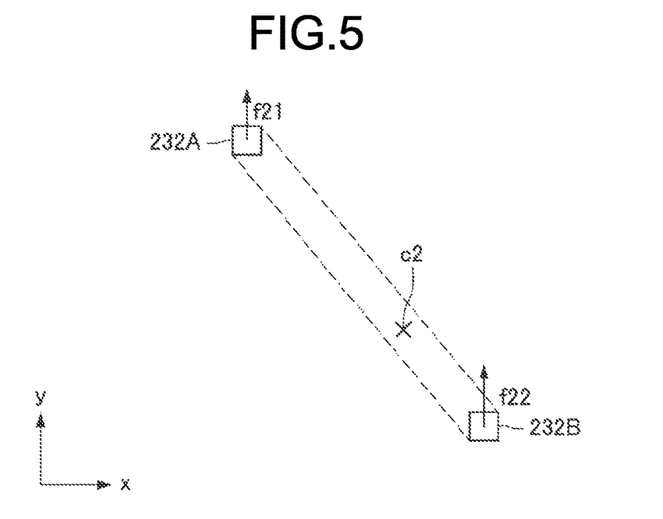
FIG. 5 is a view for describing a method of calculating a plan position of a center of gravity on the basis of reaction force received by each of two leg portions from a ground contact surface.

Next, with reference to FIG. 3 to FIG. 5, a specific method of estimating a position of a center of gravity of the robot device 1 by the information processing device 100 according to the present embodiment will be described. FIG. 3 is a schematic diagram for describing a relationship between torque and force. Also, FIG. 4 is a view for describing a method of calculating a plan position of a center of gravity on the basis of reaction force received by each of four leg portions from a ground contact surface, and FIG. 5 is a view for describing a method of calculating a plan position of a center of gravity on the basis of reaction force received by each of two leg portions from a ground contact surface.

First, the mode control unit 101 fixes a rotation angle of each joint of the leg portions 20 by fixing a posture of the robot device 1 to a predetermined posture. By fixation of the rotation angle of each joint of the leg portions 20, torque applied to each joint of the leg portions 20 reflects an increase/decrease in weight due to the load 40 placed on the loading portion 30 of the robot device 1.

Then, the center-of-gravity estimation unit 102 calculates reaction force received by each of the leg portions 20 from the ground contact surface on the basis of the torque applied to each joint of the leg portions 20. Here, as illustrated in FIG. 3, torque T acting around a fixed rotation axis is expressed as the product of force F applied to an object joined rotatably around the rotation axis and a distance L to a point to which the force is applied from the rotation axis. That is, by using magnitude of torque applied to a joint and a length of a link joined to the joint, it is possible to calculate magnitude of force applied to the link joined to the joint. For example, by using torque applied to a second joint 202A and a length of a second link 212A joined to the second joint 202A, it is possible to calculate reaction force applied from a ground contact surface to a ground contact portion 230A.

Subsequently, the center-of-gravity estimation unit 102 estimates a plan position of a center of gravity of the entire robot device 1 including the load 40 on the basis of the magnitude of the reaction force received by each of the leg portions 20 from the ground contact surface.

For example, in a case where the robot device 1 is a legged robot device having four leg portions 20, as illustrated in FIG. 4, reaction force f41, f42, f43, and f44 on ground contact surfaces 231A, 231B, 231C, and 231D of the leg portions 20 are calculated respectively on the basis of torque applied to joints of the leg portions 20.

Here, when a Y-axis is set in a direction in which the ground contact surfaces 231A and 231B are arrayed and an X-axis is set in a direction in which the ground contact surfaces 231B and 231D are arrayed and which is orthogonal to the Y axis, coordinates of a load center point c1 (COPx, COPy) can be calculated by the following expressions 1 and 2.

$$COPx = \frac{\sum_{i=1}^{4} f4ixi}{\sum_{i=1}^{4} f4i}$$ Expression 1

$$COPy = \frac{\sum_{i=1}^{4} f4iyi}{\sum_{i=1}^{4} f4i}$$ Expression 2

In a case where the robot device 1 is in a stationary state, the load center point c1 becomes equal to the plan position of the center of gravity of the entire robot device 1 including the load 40. Thus, coordinates of the plan position of the center of gravity of the entire robot device 1 including the load 40 can be calculated by the above expressions 1 and 2. Note that in FIG. 4, a region in which outer peripheral sides of the ground contact surfaces 231A, 231B, 231C, and 231D are connected by broken lines is a supporting polygon of the robot device 1. In order to prevent the robot device 1 from losing balance and rolling over, the plan position of the center of gravity of the robot device 1 exists inside the supporting polygon of the robot device 1.

Also, mass $m_d$ of the load 40 at this time can be calculated by the following expression 3. Note that g is gravitational acceleration, and m is mass of the robot device 1 alone.

$$m_d = \frac{\sum_{i=1}^{4} f4i}{g} - m$$ Expression 3

Similarly, for example, in a case where the robot device 1 is a legged robot device having two leg portions 20, a plan position of a center of gravity of the entire robot device 1 including the load 40 can be estimated as follows. More specifically, as illustrated in FIG. 5, first, reaction force f21 and f22 on ground contact surfaces 232A and 232B of the leg portions 20 are calculated, respectively.

Here, for example, when a Y-axis is set in a vertical direction when facing FIG. 5 and an X-axis is set in a horizontal direction (that is, direction orthogonal to the Y-axis) when facing FIG. 5, coordinates of a load center point c2 (COPx, COPy) can be calculated by the following expressions 4 and 5.

$$COPx = \frac{\sum_{i=1}^{2} f2ixi}{\sum_{i=1}^{2} f2i}$$ Expression 4

$$COPy = \frac{\sum_{i=1}^{2} f2iyi}{\sum_{i=1}^{2} f2i}$$ Expression 5

In a case where the robot device 1 is in a stationary state, the load center point c2 becomes equal to the plan position of the center of gravity of the entire robot device 1 including the load 40. Thus, coordinates of the plan position of the center of gravity of the entire robot device 1 including the load 40 can be calculated by the above expressions 4 and 5. Note that in FIG. 5, a region in which outer peripheral sides of the ground contact surfaces 232A and 232B are connected by broken lines is a supporting polygon of the robot device 1. In order to prevent the robot device 1 from losing balance and rolling over, the plan position of the center of gravity of the robot device 1 exists inside the supporting polygon of the robot device 1.

Also, mass $m_d$ of the load 40 at this time can be calculated by the following expression 6. Note that g is gravitational acceleration, and m is mass of the robot device 1 alone.

$$m_d = \frac{\sum_{i=1}^{2} f2i}{g} - m$$ Expression 6

Furthermore, the center-of-gravity estimation unit 102 rotates a posture of the robot device 1 around a center of gravity of the robot device 1 alone in order to estimate a height of the center of gravity of the entire robot device 1 including the load 40. Subsequently, the center-of-gravity estimation unit 102 similarly estimates a plan position of a center of gravity of the entire robot device 1 in a posture after the rotation. Then, the center-of-gravity estimation unit 102 can estimate the height of the center of gravity of the entire robot device 1 including the load 40 by performing geometric calculation using plan positions of the center of gravity of the entire robot device 1 in a plurality of postures.

In a case where the posture of the robot device 1 is rotated around the center of gravity of the robot device 1 alone, an amount of change in the plan position of the center of gravity before and after the rotation is an amount associated with a distance between the center of gravity of the robot device 1 alone and the center of gravity of the entire robot device 1 including the load 40. Thus, the center-of-gravity estimation unit 102 can estimate the height of the center of gravity of the entire robot device 1 including the load 40 from a change in the plan position of the center of gravity before and after the rotation of the robot device 1 by geometric calculation.

Note that the height of the center of gravity of the entire robot device 1 including the load 40 may be estimated by a method other than what is described above. For example, the center-of-gravity estimation unit 102 may estimate a height of a center of gravity of the robot device 1 on the assumption that the main body portion 10 provided with the loading portion 30 on which the load 40 is loaded becomes heavier for weight of the load 40. More specifically, the center-of-gravity estimation unit 102 may set, as a height of the center of gravity of the entire robot device 1 including the load 40, a height acquired by increasing of a height of the center of gravity of the robot device 1 alone on the basis of a ratio of the weight of the load 40 to weight of the robot device 1 alone. In a case where the weight of the load 40 is sufficiently smaller than the weight of the robot device 1 alone, the height of the center of gravity of the entire robot device 1 including the load 40 can be easily estimated by such a method.

3. Operation Example

Figure 6:
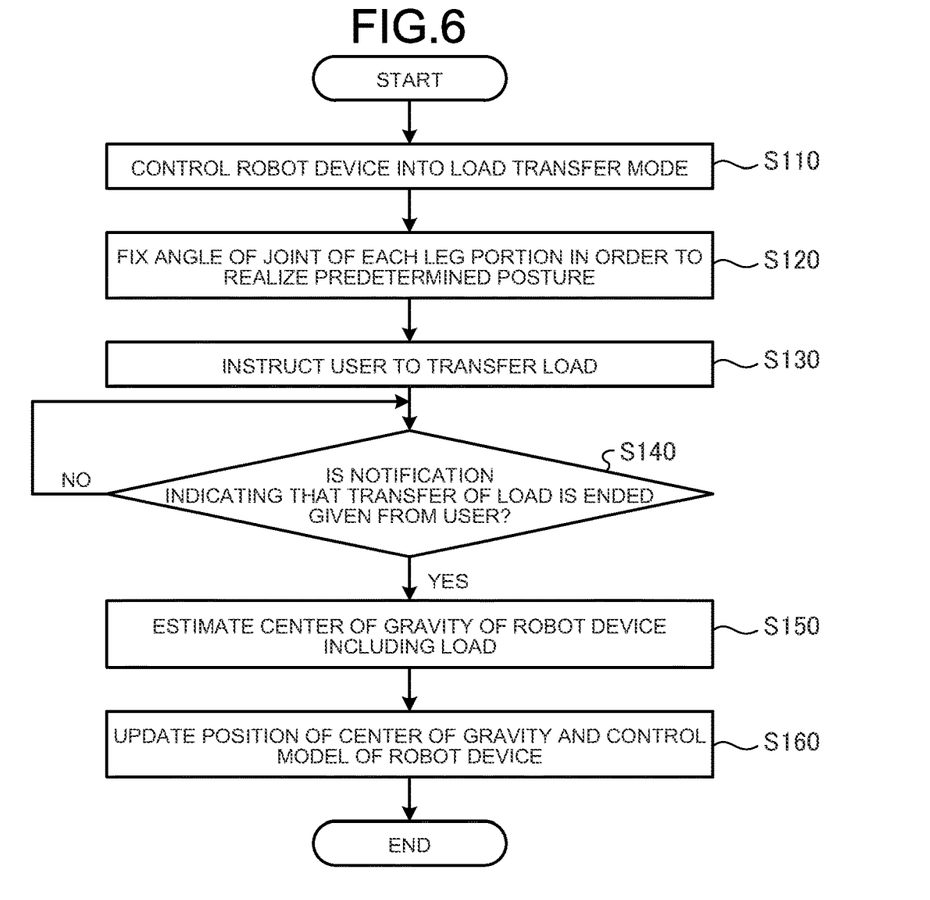
FIG. 6 is a flowchart for describing an overall flow of an operation of the information processing device according to the embodiment.
Figure 7:
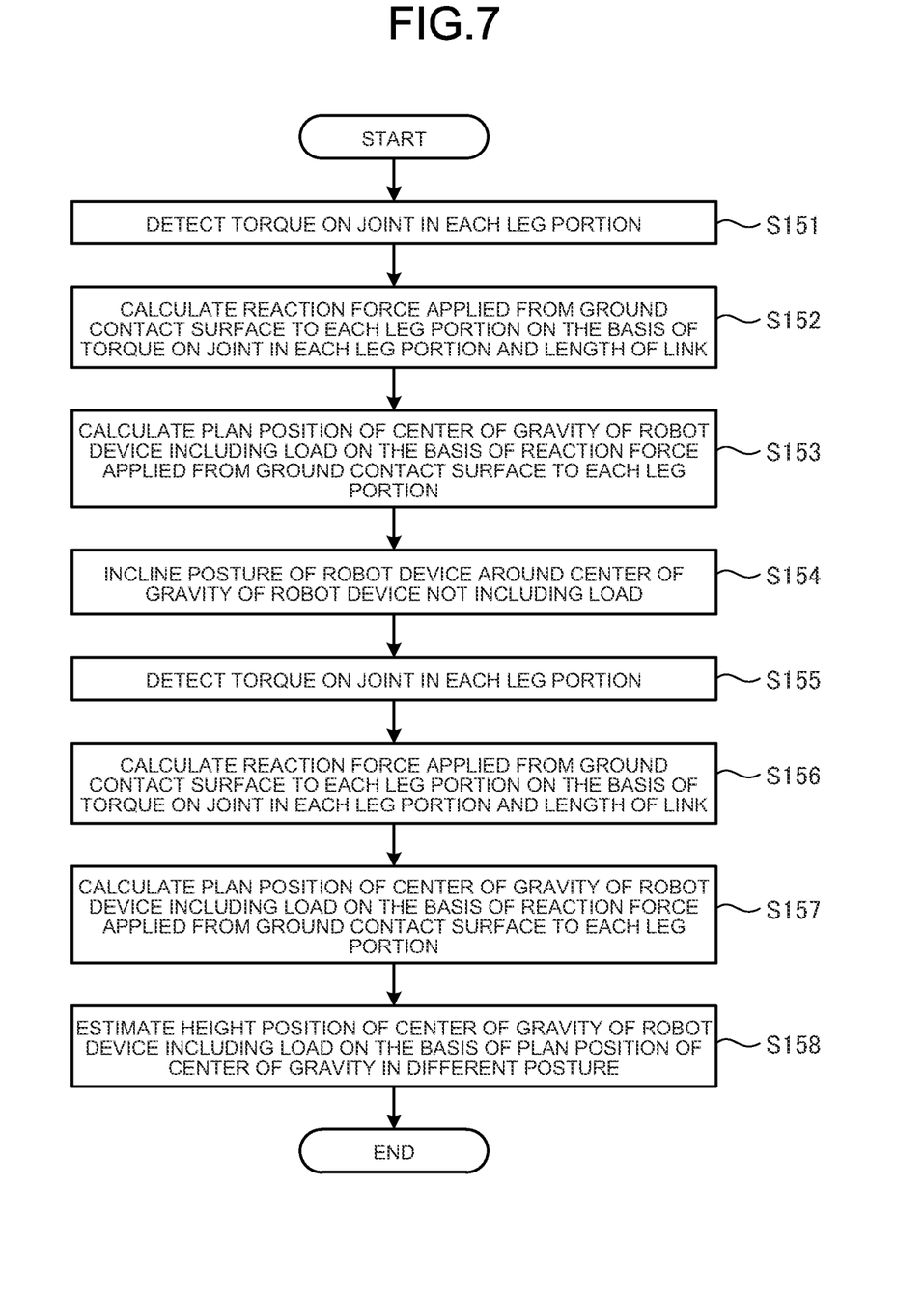
FIG. 7 is a flowchart for describing a flow of a step of estimating a center of gravity of a robot device 1 including a load in FIG. 6 in more detail.

Next, an operation example of an information processing device according to the present embodiment will be described with reference to FIG. 6 to FIG. 11. FIG. 6 is a flowchart for describing an overall flow of an operation of the information processing device according to the present embodiment, and FIG. 7 is a flowchart for describing a flow of a step of estimating a center of gravity of the robot device 1 including a load (S150) in FIG. 6 in more detail. Also, FIG. 8 to FIG. 11 are schematic diagrams for describing states of the robot device 1 in steps in FIG. 6 or FIG. 7.

As illustrated in FIG. 6, in a case where an instruction to perform a transfer of a load 40 (that is, loading or unloading of the load 40) with respect to the robot device 1 is input by a user to the robot device 1, the mode control unit 101 controls the robot device 1 into a load transfer mode (S110). For example, in a case where there is a possibility that weight balance of the robot device 1 is changed by the load 40, the user may make an input instructing the robot device 1 to transition to the load transfer mode.

Figure 8:
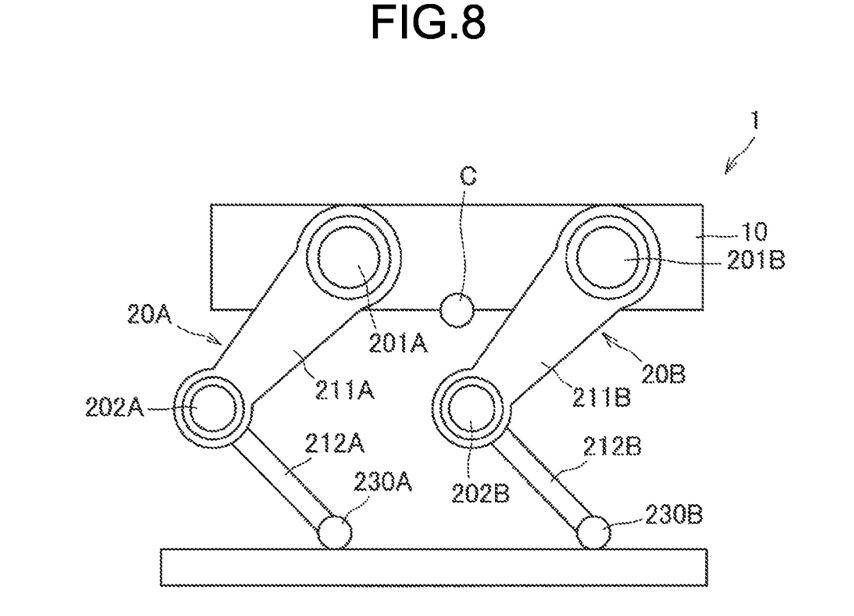
FIG. 8 is a schematic diagram for describing a state of a robot device in one step of FIG. 6 or FIG. 7.

Accordingly, the mode control unit 101 fixes a rotation angle of each joint of leg portions 20 in such a manner that the robot device 1 has a predetermined posture (S120). For example, as illustrated in FIG. 8, the robot device 1 may be fixed to a predetermined posture in which a placement surface of the loading portion 30 provided in the main body portion 10 becomes horizontal and a plan position of a center of gravity C of the robot device 1 alone is at a position close to a center of a supporting polygon. That is, the robot device 1 may be fixed in a predetermined posture in which the load 40 can be easily loaded on the loading portion 30 and stability of the robot device 1 becomes high.

After the posture of the robot device 1 is controlled to the predetermined posture, the output unit 150 gives notification permitting a transfer of the load 40 (that is, loading or unloading of the load 40) to the user (S130). Note that the notification to the user by the output unit 150 may be performed by an audio output by an audio output device, may be performed by an image or character display by a display device, or may be performed by light emission by a light emitter.

Figure 9:
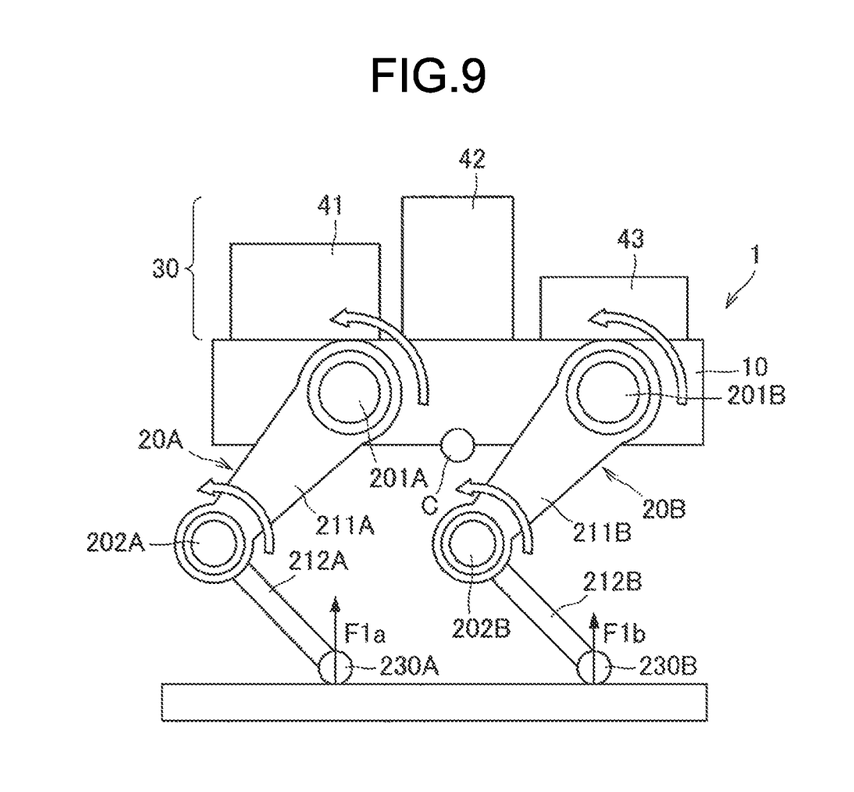
FIG. 9 is a schematic diagram for describing a state of the robot device in one step of FIG. 6 or FIG. 7.

Subsequently, the robot device 1 maintains the load transfer mode until the user inputs that the transfer of the load 40 is ended. Here, for example, in the robot device 1, the load 40 is loaded on the loading portion 30 while the predetermined posture is maintained, as illustrated in FIG. 9. Accordingly, torque applied to each joint of the leg portions 20 of the robot device 1 changes along with a change in weight balance due to the load 40. In a case where an input notifying that the transfer of the load 40 is ended is made by the user (S140/Yes), the robot device 1 starts estimation of a position of a center of gravity of the entire robot device 1 including the load 40 (S150). On the one hand, in a case where an input notifying that the transfer of the load 40 is ended is not made by the user (S140/No), the robot device 1 maintains the load transfer mode.

Figure 11:
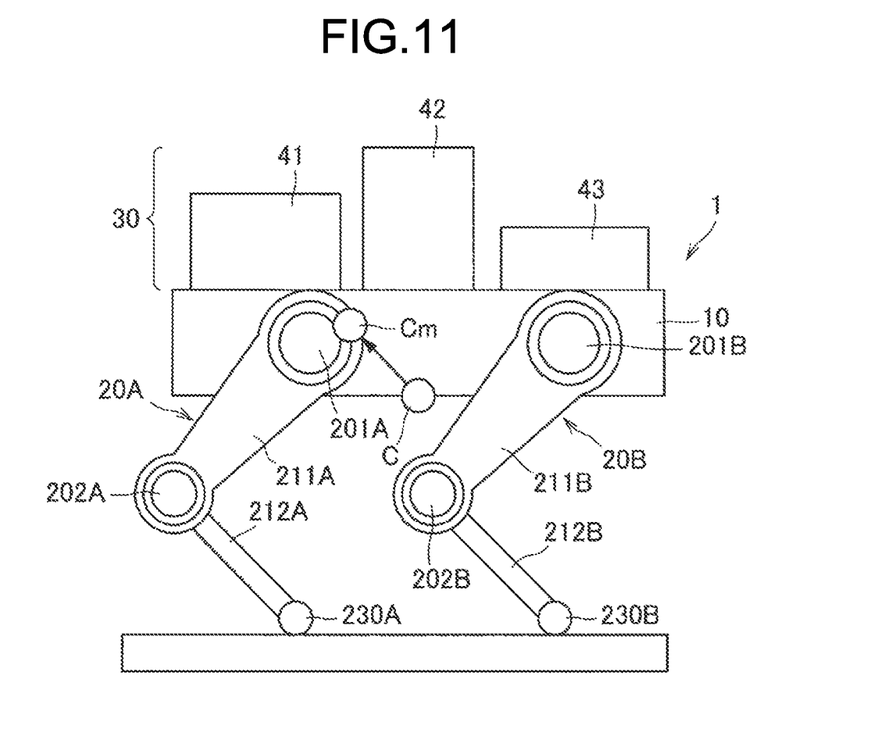
FIG. 11 is a schematic diagram for describing a state of the robot device in one step of FIG. 6 or FIG. 7.

Furthermore, the robot device 1 updates a position of a center of gravity in a control model of the robot device 1 with the estimated position of the center of gravity of the entire robot device 1 including the load 40 (S160). For example, as illustrated in FIG. 11, in a case where the load 40 is loaded and a position of a center of gravity of the robot device 1 changes from a center of gravity C of the robot device 1 alone to a center of gravity Cm of the entire robot device 1 including the load 40, the robot device 1 updates a center of gravity in the control model to the center of gravity Cm. Accordingly, the robot device 1 can control driving of each of the leg portions 20 on the basis of weight balance that reflects weight of the loaded load 40. Thus, stability of a posture or walking of when the load 40 is loaded can be improved.

Next, a flow of the step of estimating a center of gravity of the robot device 1 including a load (S150) will be described in more detail with reference to FIG. 7.

As illustrated in FIG. 7, in the step of estimating a center of gravity (S150), first, the torque detection unit 140 detects magnitude of torque applied to each joint of the leg portions 20 of the robot device 1 (S151). For example, as illustrated in FIG. 9, the torque detection unit 140 detects, at each joint of the leg portions 20 of the robot device 1, torque applied in reflection of a weight increase due to the load 40 loaded on the loading portion 30.

Subsequently, the center-of-gravity estimation unit 102 estimates magnitude of reaction force applied each of the leg portions 20 from a ground contact surface on the basis of the magnitude of the torque applied to each joint of the leg portions 20 and a length of each link of the leg portions 20 (S152). For example, as illustrated in FIG. 9, the center-of-gravity estimation unit 102 estimates reaction force F1$a$, F1$b$, F1$c$ and F1$d$ (reaction force F1$c$ and F1$d$ is not illustrated) applied to ground contact portions 230A, 230B, 230C and 230D (ground contact portions 230C and 230D are not illustrated) of leg portions 20A, 20B, 20C, and 20D (leg portions 20C and 20D and each configuration of the leg portions 20C and 20D are on a back side on a plane of paper of the leg portions 20A and 20B and are not illustrated) of the robot device 1.

Then, the center-of-gravity estimation unit 102 estimates a plan position of a center of gravity of the entire robot device 1 including the load 40 on the basis of magnitude of the reaction force applied to each of the leg portions 20 from the ground contact surface (S153). For example, as illustrated in FIG. 9, the center-of-gravity estimation unit 102 estimates the plan position of the center of gravity of the entire robot device 1 including the load 40 by calculating a load center point of the robot device 1 on the basis of the reaction force F1$a$, F1$b$, F1$c$, and F1$d$ applied to the leg portions 20A, 20B, 20C, and 20D.

Figure 10:
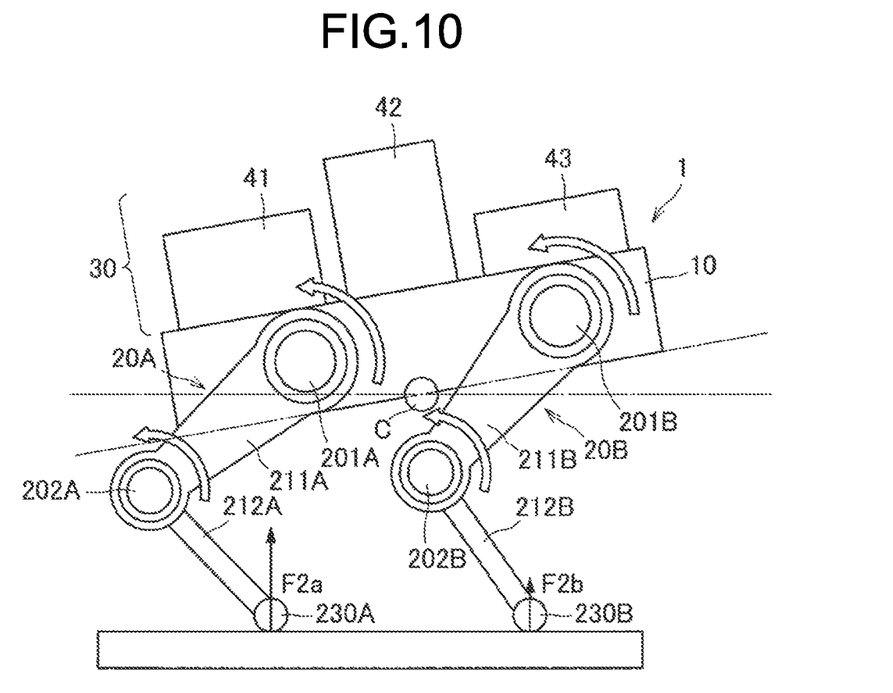
FIG. 10 is a schematic diagram for describing a state of the robot device in one step of FIG. 6 or FIG. 7.

Subsequently, the mode control unit 101 inclines a posture of the robot device 1 around the center of gravity of the robot device 1 alone (S154). For example, as illustrated in FIG. 10, the mode control unit 101 rotates the posture of the robot device 1 around a pitch axis passing through the center of gravity of the robot device 1.

Next, similarly to S151, in the robot device 1 after the rotation of the posture, the torque detection unit 140 detects the magnitude of the torque applied to each joint of the leg portions 20 of the robot device 1 (S155). For example, as illustrated in FIG. 10, the torque detection unit 140 detects, at each joint of the leg portions 20 of the robot device 1, torque applied to each joint of the leg portions 20 in the posture after the rotation.

Subsequently, similarly to S152, the center-of-gravity estimation unit 102 estimates magnitude of reaction force applied each of the leg portions 20 from the ground contact surface on the basis of the magnitude of the torque applied to each joint of the leg portions 20 and the length of each link of the leg portions 20 (S156). For example, as illustrated in FIG. 10, the center-of-gravity estimation unit 102 estimates reaction force F2$a$, F2$b$, F2$c$, and F2$d$ (reaction force F2$c$ and F2$d$ is not illustrated) applied to the ground contact portions 230A, 230B, 230C, and 230D (ground contact portions 230C and 230D are not illustrated) in the posture after the rotation.

Then, similarly to S153, the center-of-gravity estimation unit 102 estimates a plan position of a center of gravity of the entire robot device 1 including the load 40 in the posture after the rotation on the basis of the magnitude of the reaction force applied to each of the leg portions 20 from the ground contact surface (S157). For example, as illustrated in FIG. 10, the center-of-gravity estimation unit 102 estimates the plan position of the center of gravity of the entire robot device 1 by calculating a load center point of the robot device 1 in the posture after the rotation on the basis of the reaction force F2$a$, F2$b$, F2$c$, and F2$d$ applied to the ground contact portions 230A, 230B, 230C, and 230D.

Then, the center-of-gravity estimation unit 102 estimates a height of the center of gravity of the entire robot device 1 including the load 40 by performing geometric calculation using plan positions of the center of gravity of the entire robot device 1 in different postures (S158). As illustrated in FIG. 10, a plan position of the center of gravity in the posture rotated around the center of gravity of the robot device 1 alone is associated with a distance between the center of gravity of the robot device 1 alone and the center of gravity of the entire robot device 1 including the load 40. Thus, the center-of-gravity estimation unit 102 can estimate the height of the center of gravity of the entire robot device 1 including the load 40 by performing geometric calculation on the basis of a change in the plan position of the center of gravity before and after the rotation of the robot device 1.

According to the above-described operation, the information processing device 100 according to the present embodiment can estimate the position of the center of gravity of the entire robot device 1 including the load 40 placed on the loading portion 30 on the basis of the torque applied to each joint of the leg portions 20. Accordingly, the information processing device 100 can estimate the position of the center of gravity of the robot device 1 without using an expensive and fragile force sensor. Thus, since the information processing device 100 can estimate the center of gravity of the entire robot device 1 and change a control model for driving of the robot device 1 in response to a change in weight balance of the robot device 1, stability of a posture or walking of the robot device 1 can be improved.

The preferred embodiments of the present disclosure have been described in detail in the above with reference to the accompanying drawings. However, the technical scope of the present disclosure is not limited to such examples. It is obvious that a person having ordinary knowledge in the technical field of the present disclosure can conceive various alterations or modifications within the scope of the technical idea described in the claims, and it should be understood that these alterations or modifications naturally belong to the technical scope of the present disclosure.

An information processing device 100 is applied to a legged robot device 1 in the above embodiments. However, the present technology is not limited to such an example. For example, an information processing device 100 can be also applied to a flying object such as a drone that flies by rotating a plurality of rotors. More specifically, the information processing device 100 may estimate a center of gravity of the drone on the basis of magnitude of lift force generated by each of the rotors when a load 40 is transported by the drone. Accordingly, the drone can fly in a more stable posture by being controlled on the basis of the center of gravity estimated by the information processing device 100. Also, the information processing device 100 can also estimate weight of the load 40 loaded on the drone on the basis of the magnitude of the lift force generated by each of the rotors.

Also, the effects described in the present specification are merely illustrative or exemplary and are not restrictive. That is, the technology according to the present disclosure can exhibit other effects obvious to those skilled in the art from a description of the present specification in addition to the above effects or instead of the above effects.

Note that the following configurations also belong to the technical scope of the present disclosure.

(1)
An information processing device comprising:
a center-of-gravity estimation unit that calculates, on the basis of torque applied to one or more joints included in each of a plurality of leg portions, reaction force applied from a ground contact surface to each of the plurality of leg portions, and that estimates a center of gravity of a robot device including the plurality of leg portions on the basis of the calculated reaction force on the plurality of leg portions.

(2)
The information processing device according to (1), wherein
the robot device includes a loading portion on which a load is loaded, and
the center-of-gravity estimation unit estimates a center of gravity of the robot device including the load.

(3)
The information processing device according to (2), further comprising
a mode control unit that controls a rotation angle of each of the joints to be constant by controlling the robot device into a predetermined posture, wherein
the center-of-gravity estimation unit estimates the center of gravity of the robot device on the basis of a change in the torque applied to the joints before and after loading/unloading of the load.

(4)
The information processing device according to any one of (1) to (3), wherein
each of the leg portions includes a plurality of links and one or more joints, and
the center-of-gravity estimation unit calculates reaction force applied from the ground contact surfaces to the leg portions on the basis of lengths of the links and magnitude of torque applied to the joints.

(5)
The information processing device according to any one of (1) to (4), wherein the center-of-gravity estimation unit estimates a plan position of the center of gravity of the robot device on the basis of the calculated reaction force on the plurality of leg portions.

(6)
The information processing device according to any one of (1) to (5), wherein the center-of-gravity estimation unit estimates a height of the center of gravity of the robot device on the basis of the reaction force on each of the plurality of leg portions which force is calculated in a plurality of postures of the robot device.

(7)
The information processing device according to (6), wherein the plurality of postures is postures of the robot device mutually rotated around the center of gravity of the robot device alone.

(8)
The information processing device according to any one of (1) to (7), further comprising a drive control unit that controls a posture or movement of the robot device on the basis of the estimated center of gravity.

(9)
The information processing device according to any one of (1) to (8), further comprising a stability determination unit that determines stability of a posture of the robot device on the basis of the estimated center of gravity.

(10)
The information processing device according to (9), wherein
the robot device includes an output unit, and
the output unit performs notification processing for a user on the basis of the determination made by the stability determination unit.

(11)
The information processing device according to any one of (1) to (10), wherein the robot device is a legged robot device including four of the leg portions.

(12)
An information processing method comprising:
calculating, on the basis of torque applied to one or more joints included in each of a plurality of leg portions, reaction force applied from a ground contact surface to each of the plurality of leg portions; and
estimating a center of gravity of a robot device including the plurality of leg portions on the basis of the calculated reaction force on the plurality of leg portions,
calculating and estimating being performed by an arithmetic processing unit.

(13)
A program causing a computer to function as
a center-of-gravity estimation unit that calculates, on the basis of torque applied to one or more joints included in each of a plurality of leg portions, reaction force applied from a ground contact surface to each of the plurality of leg portions, and that estimates a center of gravity of a robot device including the plurality of leg portions on the basis of the calculated reaction force on the plurality of leg portions.

REFERENCE SIGNS LIST 1 robot device
10 main body portion
20 leg portion
30 loading portion
40 load
100 information processing device
101 mode control unit
102 center-of-gravity estimation unit 103 stability determination unit
110 input unit
120 drive control unit
130 drive unit
140 torque detection unit
150 output unit

The invention claimed is:

1. An information processing device, comprising:
a central processing unit (CPU) configured to:
calculate, based on torque applied to a plurality of joints included in each of a plurality of leg portions, reaction force applied from a ground contact surface to each of the plurality of leg portions;
estimate a center of gravity of a robot device including the plurality of leg portions and a load on a loading portion, based on the calculated reaction force on the plurality of leg portions and change in the torque applied to the plurality of joints before and after loading/unloading of the load; and
control a rotation angle of each of the plurality of joints to be constant by controlling the robot device into a specific posture,
wherein the robot device includes the loading portion on which the load is loaded.

2. The information processing device according to claim 1, wherein each of the plurality of leg portions includes a plurality of links and the plurality of joints, and
the CPU is further configured to calculate the reaction force applied from the ground contact surface to the plurality of leg portions based on lengths of the links and magnitude of the torque applied to the plurality of joints.

3. The information processing device according to claim 1, wherein the CPU is further configured to estimate a plan position of the center of gravity of the robot device based on the calculated reaction force on the plurality of leg portions.

4. The information processing device according to claim 1, wherein the CPU is further configured to estimate a height of the center of gravity of the robot device based on the reaction force on each of the plurality of leg portions calculated in a plurality of postures of the robot device.

5. The information processing device according to claim 4, wherein the plurality of postures is postures of the robot device mutually rotated around the center of gravity of the robot device alone.

6. The information processing device according to claim 1, the CPU is further configured to control a posture or movement of the robot device based on the estimated center of gravity.

7. The information processing device according to claim 1, the CPU is further configured to determine stability of a posture of the robot device based on the estimated center of gravity.

8. The information processing device according to claim 7, wherein
the robot device includes an output unit, and
the CPU is further configured to perform notification processing for a user based on the determined stability.

9. The information processing device according to claim 1, wherein the robot device is a legged robot device including four leg portions.

10. An information processing method, comprising:
calculating, based on torque applied to a plurality of joints included in each of a plurality of leg portions, reaction force applied from a ground contact surface to each of the plurality of leg portions;
estimating a center of gravity of a robot device including the plurality of leg portions and a load on a loading portion, based on the calculated reaction force on the plurality of leg portions and change in the torque applied to the plurality of joints before and after loading/unloading of the load; and
controlling a rotation angle of each of the plurality of joints to be constant by controlling the robot device into a specific posture,
wherein the robot device includes the loading portion on which the load is loaded.

11. A non-transitory computer-readable medium having stored thereon, computer-executable instructions which, when executed by a computer, cause the computer to execute operations, the operations comprising:
calculating, based on torque applied to a plurality of joints included in each of a plurality of leg portions, reaction force applied from a ground contact surface to each of the plurality of leg portions;
estimating a center of gravity of a robot device including the plurality of leg portions and a load on a loading portion, based on the calculated reaction force on the plurality of leg portions and change in the torque applied to the plurality of joints before and after loading/unloading of the load; and
controlling a rotation angle of each of the plurality of joints to be constant by controlling the robot device into a specific posture,
wherein the robot device includes the loading portion on which the load is loaded.

* * * * *